United States Patent
Bhowmik et al.

(10) Patent No.: US 11,779,039 B2
(45) Date of Patent: Oct. 10, 2023

(54) ENZYMATIC PROCESS

(71) Applicant: GIVAUDAN SA, Vernier (CH)

(72) Inventors: Tarun Bhowmik, Mason, OH (US); Stefka Ivanova Myaka, Loveland, OH (US); Johan Peter Van Leersum, Morrow, OH (US); Roy Wade Smith, Cold Spring, KY (US)

(73) Assignee: GIVAUDAN SA, Vernier (CH)

( * ) Notice: Subject to any disclaimer, the term of this patent is extended or adjusted under 35 U.S.C. 154(b) by 413 days.

(21) Appl. No.: 15/955,220

(22) Filed: Apr. 17, 2018

(65) Prior Publication Data

US 2018/0235265 A1 Aug. 23, 2018

Related U.S. Application Data

(63) Continuation of application No. 12/921,994, filed as application No. PCT/CH2009/000094 on Mar. 13, 2009, now abandoned.

(60) Provisional application No. 61/037,064, filed on Mar. 17, 2008.

(51) Int. Cl.
*A23L 27/40* (2016.01)

(52) U.S. Cl.
CPC .................. *A23L 27/45* (2016.08)

(58) Field of Classification Search
CPC ..................................... A23L 27/45
See application file for complete search history.

(56) References Cited

U.S. PATENT DOCUMENTS

| | | | |
|---|---|---|---|
| 5,711,985 | A | 1/1998 | Guerrero et al. |
| 5,738,887 | A | 4/1998 | Wu et al. |
| 5,958,755 | A | 9/1999 | Skelton et al. |
| 6,007,851 | A | 12/1999 | Schoenmaker et al. |
| 6,838,100 | B2 | 1/2005 | Jaeger et al. |
| 6,953,574 | B2 | 10/2005 | Sobol et al. |
| 2002/0192774 | A1 | 12/2002 | Ahring et al. |
| 2003/0134006 | A1 | 7/2003 | Chukwu |
| 2004/0131748 | A1 | 7/2004 | Allen et al. |

FOREIGN PATENT DOCUMENTS

| | | | | |
|---|---|---|---|---|
| EP | 0600684 | A | 6/1994 | |
| EP | 1163853 | A | 12/2001 | |
| JP | 200675084 | A | 3/2006 | |
| JP | 2006075084 | * | 3/2006 | ............... A23L 1/30 |
| WO | 0201963 | A3 | 1/2002 | |
| WO | 2005096847 | A1 | 10/2005 | |
| WO | 2008122138 | A | 10/2008 | |

OTHER PUBLICATIONS

Fuji et al. (JP 200454528) Machine Translation Sep. 2004 (Year: 2004).*
Yang et al. CN 101088421 Dec. 2007 (IP.com translation) (Year: 2007).*
International Search Report for corresponding application PCT/CH2009/000094 dated Aug. 3, 2009.
Database WPI, Section CH, Week 200875, Thomson Scientific, London, GB 2008-M67026,XP002536600.
Y. Kurobayashi et al., "Flavour Enhancement of Chicken Broth from Boiled Celery Constituents", Agriculture and Food Chemistry, vol. 56, pp. 512-516, 2007, XP002536596.
"Celery Extracts Offer Flavour-ENhancing Properties", Retrieved from the Internet, 2008, XP002536597.
S. Daniels, Celery Extracts Enhance Chicken Broth, Study, Retrieved from the Internet, 2008, XP002536598.
J. W. Uhlig, et al., "Effect of Phtalides on Celery Flavour", Journal of Food Science, vol. 52, No. 3, pp. 658-660, XP002536599.
Anonymous, "Reducing Sodium (Salt) in Your Diet", Retrieved from the Internet, 2006, XP002406794.
Guerard, et al., "Production of tuna waste hydroysates by a commercial neutral protease preparation", 2002 Journal of Molecular Catalysis, B: Enzymatic 19-20, pp. 489-798.
J. Karovicova, et al., "Lactic acid fermented vegetable juices", Horticultural Science, 2003, Prague, vol. 30, Issue 4, pp. 152-158.

* cited by examiner

*Primary Examiner* — Felicia C Turner
(74) *Attorney, Agent, or Firm* — Curatolo Sidoti & Trillis Co., LPA; Floyd Trillis, III; Salvatore A. Sidoti

(57) ABSTRACT

Provided is an enzymatic process that hydrolyzes celery plant material to form a salt-enhancing ingredient, the formed salt-enhancing ingredient, food products comprising said salt-enhancing ingredient and a method of enhancing the salty taste of food products.

6 Claims, No Drawings

ENZYMATIC PROCESS

This is a Continuation application of U.S. Ser. No. 12/921,994 filed 10 Sep. 2010, which in turn was an application filed under 35 USC 371 of PCT/CH2009/000094, filed 13 Mar. 2009 which claimed the priority benefit of U.S. Ser. No. 61/037,064, filed 17 Mar. 2008. The present application claims all available priority benefit to the foregoing applications and also incorporates the disclosures of the foregoing applications in their entirety as if set forth herein.

TECHNICAL FIELD

Disclosed is a novel ingredient and the enzymatic process to form said ingredient to enhances saltiness in food products, in particular in food products with a low or reduced sodium content, to improve their taste.

BACKGROUND

A high amount of sodium intake is considered to be detrimental to health and therefore there is a desire to reduce the amount of sodium chloride (NaCl) in food products, without reducing the desired salty taste at the same time. The salty taste is very important to the perceived flavour intensity and profile, especially for savory food products.

There exists a need in the food industry to provide ingredients that enhance the salty taste of food products so that NaCl can be reduced.

Potassium Chloride (KCl) is used to replace other salts, particularly NaCl. If KCl is used in the desired concentration to reduce NaCl, an undesirable bitter and metallic taste is perceived by the consumer. Furthermore, certain individuals desire to avoid KCl due to health concerns. It would therefore be of interest to find a product that is able to enhance the salty taste of NaCl so that KCl can be partially or completely replaced.

Celery, and in particular the volatile part of celery, especially certain volatile phthalides, has been described to enhance saltiness and umami taste in chicken broth (Y. Kurobayashi et al. (2007), J. Agric. Food. Chem. 56, 512-516). However, intensity and duration of saltiness are still unsufficient for many food products and could be improved. Furthermore the isolation/enrichment of the volatile part is impractical.

SUMMARY

Provided is the following:

(1) A process to form a salt enhancing ingredient comprising the steps of
(i) forming an aqueous slurry of *Apium graveolens* plant material, and
(ii) forming a hydrolysate of *Apium graveolens* plant material by subjecting it to an enzymatic hydrolysis using one or more proteolytic enzymes.

(2) The process as described under item (1), wherein the formed salt enhancing ingredient is inactivated by heating.

(3) The process as described under any one of items (1) to (2) wherein the one or more proteolytic enzymes are selected from the group consisting of proteinase, peptidase, and glutaminase.

(4) The process as described under any one of items (1) to (3) wherein the one or more proteolytic enzymes comprise both proteinase and peptidase enzymes.

(5) The process as described under any one of items (1) to (4) wherein the one or more proteolytic enzymes comprise an enzyme preparation from *Aspergillus oryzae* (Umamizyme™) and the hydrolysis is performed at 40° C. to 60° C.

(6) The process as described under any one of items (1) to (5) wherein the hydrolysate is formed by subjecting the *Apium graveolens* plant material to an enzymatic hydrolysis using one or more carbohydrase enzymes in parallel or subsequent to enzymatic hydrolysis by the one or more proteolytic enzymes.

(7) The process as described under any one of items (1) to (6) wherein the hydrolysate is subjected to fermentation using a *Lactobacillus*.

(8) The process as described under item (7) wherein the *Lactobacillus* microorganism is selected from the group consisting of *L. plantarum, L. casei, L. brevis* and *L. helveticus*.

(9) The salt enhancing ingredient formed by the process as described under any one of items (1) to (8).

(10) The salt enhancing ingredient as described under item (9) which is concentrated at least 1.5 times by removing water.

(11) The salt enhancing ingredient as described under any one of items (9) to (10) wherein the salt enhancing ingredient is spray-dried.

(12) A flavor composition for food products comprising the salt enhancing ingredient as described under any one of items (9) to (11) and one or more food-grade excipient.

(13) The flavor composition as described under item (12) wherein the concentration of the salt enhancing ingredient of claim 9 is 0.02% to 0.3% (wt/wt) based on the unconcentrated salt enhancing ingredient.

(14) A food product comprising the salt enhancing ingredient as described under any one of items (9) to (11).

(15) The food product as described under item (14) wherein the concentration of the salt enhancing ingredient as described under any one of items (9) to (11) is 0.001% to 0.015% (wt/wt) based on the unconcentrated salt enhancing ingredient.

(16) The food product as described under any one of items (14) to (15) which is a reduced or low sodium food product.

(17) The food product as described under item (16) wherein the sodium chloride concentration is 0.15% (wt/wt) to 3% (wt/wt).

(18) The food product as described under item (16) wherein the sodium chloride concentration is 0.15% (wt/wt) to 1.5% (wt/wt).

(19) The reduced or low sodium food product as described under any one of items (16) to (18) additionally comprising KCl, optionally in a concentration of 0.1% to 2% (wt/wt) KCl.

(20) A method of providing a food product enhanced in saltiness wherein the salt enhancing ingredient as defined under any one of items (9) to (11) is admixed to a food product.

(21) The method as described under item (16) wherein the food product is a reduced or low sodium food product optionally containing KCl, optionally in a concentration of 0.1% to 2% (wt/wt) KCl.

DETAILED DESCRIPTION

Surprisingly, it has now been found that when celery is treated enzymatically with one or more proteolytic enzymes including, without limitation, the enzyme classes of protease, peptidase, and glutaminase, an ingredient can be formed that has an enhancing effect on the perception of salty taste in food products and exhibits a salty taste of higher intensity, later onset and longer duration.

By salt enhancing is meant the effect of an ingredient on the salty taste in food which is found more pronounced (stronger, enhanced) in its taste intensity and/or longer in its duration as analyzed by trained panellists sensitive to salty taste, when comparing food comprising an ingredient with a salt enhancing effect to food without an added salt enhancing ingredient.

The enhanced intensity and duration of the perception of salty taste by the salt enhancing ingredient can be increased by additionally using a carbohydrase enzyme, either in parallel or consecutively, in its formation.

The enhanced intensity and duration of the perception of salty taste can be further increased by an optional fermentation step employing *Lactobacillus* bacteria, for example, *Lactobacillus plantarum*.

Useful plant material ("Celery"/*Apium graveolens*)

By "celery" as used herein, *Apium graveolens* is meant. *Apium graveolens* is a plant species in the family Apiaceae, and yields celery and celeriac. Stalks from *Apium graveolens* dulce are useful for the processes and ingredients described herein but any material from any *Apium graveolens* plant can be used. The plant material can be fresh or re-hydrated dried whole celery, or a non-volatile fraction thereof. Usually the crisp petiole (leaf stalk) or the fleshy taproot of the plant are used, but the leaves can be used as well.

Useful celery varieties/cultivar groups include *Apium graveolens* graveolens (wildtype), *Apium graveolens* secalinum (Alef.) Mansf (a leaf celery), *Apium graveolens* dulce (Mill.) Pers. (Stalk celery), and *Apium graveolens* rapaceum (Mill.) Gaudin (Celeriac, with a roundish tuber that incorporates hypocotyl as well as part of the taproot and stem).

There are a great variety of useful cultivars, for example, without limitation, Celeriac cultivars include 'Balder' and 'Giant Prague'; Stalk celery cultivars include 'Pascal', 'Utah', 'Golden Self-Blanching' and Tendercrisp', Plein Blanc Pascal', 'Tall Utah' and 'Elne'; Leaf celery cultivars include 'Jujr, Duka' and 'Safiya'.

Enzymes

Useful enzyme classes include proteolytic enzymes that hydrolyze bonds in a protein, and optionally, a carbohydrase.

Proteolytic enzyme preparations usually contain proteinases, which hydrolyze proteins to form small peptides, and peptidases, which hydrolyze small proteins or peptides, usually to release amino acids from their terminal ends. Often proteinases and peptidases with both endopeptidase and exopeptidase activity are included in such preparations, to efficiently break down a protein both from within and from the ends of each protein and resulting peptide.

Useful proteolytic enzymes include, without limitation, an enzyme with one or more of the following activities:

protease, peptidase, glutaminase (including, without limitation, L-glutamine-amido-hydrolase (EC 3.5.1.2)), endoprotease, serine endopeptidase, subtilisin peptidase (EC 3.4.21.62).

Other proteolytic enzymes are useful as well, and a great variety are known and available; some additional types and examples are given below.

Proteolytic enzymes (also called proteases, proteinases, or peptidases) are currently classified in six groups including serine protease, threonine protease, cysteine protease, aspartic acid protease, metalloprotease, and glutamic acid protease. Proteolytic enzymes can cut at the end of a protein (exopeptidases) or attack internal peptide bonds of a protein (endopeptidases). Exopeptidases include, without limitation, aminopeptidases, carboxypeptidases, and carboxypeptidase A. Endopeptidases include, without limitation, trypsin, chymotrypsin, pepsin, papain, and elastase.

Proteolytic enzymes (EC 3.4 and EC 3.5) are classified by an EC number (enzyme commission number), each class comprises various known enzymes of a certain reaction type.

EC 3.4 comprises enzymes acting on peptide bonds (peptidases/proteinases) and EC 3.5 comprises enzymes that act on carbon-nitrogen bonds other than peptide bonds.

Examples for EC 3.4 include, without limitation, the following: aminopeptidase (EC 3.4.11), dipeptidase (3.4.13), dipeptidyl-peptidase (3.4.14), peptidyl-dipeptidase (3.4.15), serine-carboxypeptidase (3.4.16), metallocarboxypeptidase (3.4.17), cysteine-carboxypeptidase (3.4.18), omegapeptidase (3.4.19), serine-endopeptidase (3.4.21), cysteine-endopeptidase (3.4.22), aspartate-endopeptidase (3.4.23), metalloendopeptidase (3.4.24), threonine-endopeptidase (3.4.25).

Examples for EC 3.5 include, without limitation, proteolytic enzymes that cleave in linear amides (3.5.1), for example, without limitation, glutaminase (EC 3.5.1.2).

Various proteolytic enzymes are commercially available; the following proteolytic enzymes are available from Sigma-Aldrich:

Achromopeptidase, Aminopeptidase, Ancrod, Angiotensin Converting Enzyme, Bromelain, Calpain, Calpain I, Calpain II, Carboxypeptidase A, Carboxypeptidase B, Carboxypeptidase G, Carboxypeptidase P, Carboxypeptidase W, Carboxypeptidase Y, Caspase, Caspase 1, Caspase 2, Caspase 3, Caspase 4, Caspase 5, Caspase 6, Caspase 7, Caspase 8, Caspase 9, Caspase 10, Caspase 13, Cathepsin B, Cathepsin C, Cathepsin D, Cathepsin G, Cathepsin H, Cathepsin L, Chymopapain, Chymase, Chymotrypsin, a-Clostripain, Collagenase, Complement C1r, Complement C1s, Complement Factor D, Complement factor I, Cucumisin, Dipeptidyl Peptidase IV, Elastase, leukocyte, Elastase, pancreatic, Endoproteinase Arg-C, Endoproteinase Asp-N, Endoproteinase Glu-C, Endoproteinase Lys-C, Enterokinase, Factor Xa, Ficin, Furin, Granzyme A, Granzyme B, HIV Protease, IGase, Kallikrein tissue, Leucine Aminopeptidase (General), Leucine aminopeptidase, cytosol, Leucine aminopeptidase, microsomal, Matrix metalloprotease, Methionine Am inopeptidase, Neutrase, Papain, Pepsin, Plasmin, Prolidase, Pronase E, Prostate Specific Antigen, Protease, Alkalophilic from Streptomyces griseus, Protease from *Aspergillus*, Protease from *Aspergillus saitoi*, Protease from *Aspergillus sojae*, Protease (*B. licheniformis*) (Alkaline), Protease (*B. licheniformis*) (Alcalase), Protease from *Bacillus polymyxa*, Protease from *Bacillus* sp, Protease from *Bacillus* sp (Esperase), Protease from *Rhizopus* sp., Protease S, Proteasomes, Proteinase from *Aspergillus oryzae*, Proteinase 3, Proteinase A, Proteinase K, Protein C, Pyroglutamate aminopeptidase, Renin, Rennin, Streptokinase, Subtilisin, Thermolysin, Thrombin, Tissue Plasminogen Activator, Trypsin, Tryptase, Urokinase.

One or more of the proteolytic enzymes described herein may be combined with a carbohydrase.

Useful enzyme combinations include, without limitation, combinations wherein at least one proteolytic enzyme is combined with at least one carbohydrase.

Useful carbohydrase enzymes to break down carbohydrate plant material include, without limitation, carbohydrases with one or more of the following activities: beta-glucanase (including, without limitation, 1,3-beta-glucan-gluco-hydrolase (EC 3.2.1.58)), beta-amylase, cellulase, hemicellulase, xylanase.

For example, the following combinations are useful:

| Protease/Peptidase/Glutaminase | Carbohydrase |
| --- | --- |
| protease | beta-glucanase |
| protease | beta-amylase |
| protease | cellulase |
| protease | hemicellulase |
| protease | xylanase |
| endoprotease | beta-glucanase |
| endoprotease | beta-amylase |
| endoprotease | cellulase |
| endoprotease | hemicellulase |
| endoprotease | xylanase |
| peptidase | beta-glucanase |
| peptidase | beta-amylase |
| peptidase | cellulase |
| peptidase | hemicellulase |
| peptidase | xylanase |
| serine endopeptidase | beta-glucanase |
| serine endopeptidase | beta-amylase |
| serine endopeptidase | cellulase |
| serine endopeptidase | hemicellulase |
| serine endopeptidase | xylanase |
| L-glutamine-amido-hydrolase | beta-glucanase |
| L-glutamine-amido-hydrolase | beta-amylase |
| L-glutamine-amido-hydrolase | cellulase |
| L-glutamine-amido-hydrolase | hemicellulase |
| L-glutamine-amido-hydrolase | xylanase |
| subtilisin peptidase | beta-glucanase |
| subtilisin peptidase | beta-amylase |
| subtilisin peptidase | cellulase |
| subtilisin peptidase | hemicellulase |
| subtilisin peptidase | xylanase |

A useful combination is a 1,3-beta-glucan-gluco-hydrolase (EC 3.2.1.58) with protease selected from a serine endopeptidase, a peptidase/protease, or a subtilisin peptidase (EC 3.4.21.62).

As 1,3-beta-glucan-gluco-hydrolase, for example, without limitation, one or more of Ceremix™ (Novozymes, Bagsvaerd, Denmark) or Viscozyme™ (Novozymes, Bagsvaerd, Denmark) may be used.

As protease/peptidase/glutaminase, for example, without limitation, one or more of Alcalase™, a serine endopeptidase (Novozymes, Bagsvaerd, Denmark), Umamizyme™, a protease/peptidase (Amami, Nagoya, Japan), or Flavorpro 373™, a subtilisin peptidase (Biocatalysts, Cardiff, UK), may be used.

All enzymes used should be food-grade.

Enzymatic Hydrolysis

Enzymatic hydrolysis is performed under conditions suitable for all enzymes employed. As will be apparent to the skilled person, the temperature and pH should be within a suitable range for hydrolysis to occur to the desired degree. The incubation length will vary accordingly, with shorter incubations when conditions are nearer to the optimum conditions. Usually 1 to 48 hours will be sufficient, for example, 10 to 24 hours. Necessary ions, if required or benefitial for the chosen enzyme(s), should be present as the skilled person will be aware. Stirring the incubation mix, for example 50 to 500 rpm, or 100 to 200 rpm, usually improves the hydrolysis. Some enzymes tolerate stirring better than others. Tolerance towards one factor often depends on the other factors. Such information on suitable conditions is readily available for many enzymes and otherwise can be easily determined.

A number of enzyme preparations, including Ceremix™, Alcalase™, Viscozyme™ and Umamizyme™, will work well in a liquified slurry of celery in water at a temperature from 40° C. to 55° C., for example about 45° C. to about 55° C., without pH adjustment or any added co-factors. Others may need or will benefit from pH or temperature adjustment, or additives. Umamizyme™ will tolerate temperatures from about 40° C. to about 60° C., with an optimum at around 55° C. Umamizyme™ originates from *Aspergillus oryzae* and is rich in endopeptidase and exopeptidase activity.

Sufficient units of the enzyme to achieve a substantial hydrolysis until the desired degree of salty taste is achieved should be used.

The amount of enzyme is chosen to ensure sufficient activity and avoid developing bitter notes. The amount used depends on the activity of the enzyme, this information is usually known, else it can be tested easily. The amount of enzyme also depends on the amount of protein and there should be a ratio of 0.5:20 to 3:20 of enzyme:protein (0.5 to 3 parts enzyme for 20 parts of protein), for example 1:20 of enzyme:protein (Ceremix™, Novozymes, Bagsvaerd, Denmark, has an activity of 300 Beta-Glucanase Units (BGU) per gram of enzyme; Viscozyme™, Novozymes, Bagsvaerd, Denmark, has an activity of 100 Fungal Beta-Glucanase Units FBG per gram of enzyme; Alcalase™, Novozymes, Bagsvaerd, Denmark, has an activity of 2.4 Anson untis (AU) per gram of enzyme; Umamizyme™, Amano, Nagoya, Japan, has an activity of 70 U (Units by LGG method, LGG=L-Leucyl-Glycyl-Glycine); Flavorpro 373™, a Glutaminase, Biocatalysts, Cardiff, UK, has an activity of 30 Glutaminase Units (GU)).

Useful amounts of enzyme units per gram starting material are indicated for some type of enzymes below.

Beta-Glucanase Units (BGU) per gram starting material (liquified celery slurry) 0.03 to 15 BGU, for example 0.1 to 3 BGU.

Fungal Beta-Glucanase Units FBG per gram starting material, 0.002 to 3 FBG, for example, 0.01 to 1 FBG.

Anson untis (AU) per gram starting material, 0.0002 to 0.02 AU, for example 0.0005 to 0.01.

U (Units by LGG method, LGG=L-Leucyl-Glycyl-Glycine) per gram starting material 0.007 to 0.7 U, for example, 0.01 to 0.1 U are used. Glutaminase Units (GU) per gram starting material, 0.00075 to 0.075 GU, for example, 0.001 to 0.02 GU are used.

The amount of enzyme will vary depending on enzyme and conditions it is used in. The necessary amount can be easily determined by trying out different amounts and testing the effect of the resulting product in a sensory evaluation as described herein.

The hydrolysate of the celery slurry hydrolyzed by one or more of proteolytic and optionally one or more of carbohydrase enzymes may be used directly as a salt enhancing ingredient.

Usually it will be heat-inactivated before use by a final heat treatment (sterilization or pasteurization) high and long enough to inactivate enzymes and optionally microorganisms, as detailed herein-below.

Alternatively, the hydrolysate is subjected to a fermentation.

Fermentation

Fermentation is performed with a *Lactobacillus* bacterium, for example, *Lactobacillus plantarum*. Other *Lactobacillus* species may also be useful, for example, *L. casei, L. brevis* and *L. helveticus* may also be useful.

An overnight culture of *Lactobacillus* may be used, or the hydrolysate may be directly inoculated from a *Lactobacillus* clone, and the fermentation performed for a slightly longer time accordingly.

The seed culture/overnight culture for the following fermentation may be prepared by methods well-known in the art. It may be grown overnight, for example 12 hours, at the appropriate temperature for the microorganism. 37° C. is a suitable temperature for *L. plantarum*. Any suitable medium may be selected, for example MRS broth (Difco, United States of America).

The inoculated material is fermented for several hours, for example, 5 hours to 48 hours, 10 hours to 30 hours, or 15 hours to 25 hours.

The fermentation with *Lactobacillus* is started using the hydrolysate as fermentation broth and adding a sufficient volume of an overnight seed culture at a pH of at least 6 or higher, for example a pH of 6 to 7. Fermentation is allowed to proceed until the pH has lowered to at least pH 5.5 or lower, for example pH 5.5 to pH 4.5.

The fermentation temperature is chosen to accommodate the microorganism. Useful temperature ranges for *Lactobacilli* and in particular *L. plantarum* include, for example, from about 20° C. to about 40° C., from about 30° C. to about 40° C., or from about 35 to about 40° C., with an optimum of about 36° C. to about 38° C. At a low temperature the growth rate will be low, at a high temperature the microorganism will be killed or reduced in numbers.

The fermentation container should be minimally stirred to ensure proper mixing but at the same time ensure that the bacteria can grow anaerobically (*Lactobacilli* are facultative anaerobic but usually grow faster under anaerobic conditions, aerotolerance may be manganese-dependent).

The fermented product can be used directly as a salt enhancing ingredient, but usually will be followed by a final heat treatment (sterilization or pasteurization) high and long enough to inactivate enzymes and microorganisms.

Usually the hydrolyzed or the fermented product will be heat-inactivated before use, for example by heating from about 60° C. to about 121° C. or higher for sufficiently long to inactivate enzymes and bacteria (for example, without limitation, any pasteurization or sterilization method, which are well known in the art, for example, without limitation, about 70° C., about 90° C. or higher for 30 min. When heating above about 100° C., for example, about 121° C. for 30 min, heating has to be performed under pressure, usually about 12-15 psi).

The pH during fermentation should be from about pH 6 to about pH 7. If the pH is below 6, *Lactobacillus plantarum* will grow very slowly and usually not sufficiently.

During fermentation the pH will lower to about pH 4 or lower, for example about pH 5.5 to about pH 3.5.

Afterwards, the pasteurized fermentation broth may be filtered to remove any larger particles and may be concentrated, for example by evaporation, including boiling at for example up to about 100° C.

Form of Use

The salt enhancing ingredient may be used as such or in filtered and/or concentrated form. Alternatively, the concentrated salt enhancing ingredient may be used as a paste or powder or spray-dried by methods well known in the art. For the spray-dried salt enhancing ingredient, well known carriers and anti-caking agents may be added.

Optional filtering may be performed by any suitable filtering method, such methods are well known in the art, for example, by passing through a felt filter bag in a filter centrifuge. The filtered culture (supernatant containing the remaining smaller solids, minus the biomass that includes larger undigested proteins) can be concentrated, for example concentrated 2× by evaporation/boiling at 100° C. The resulting concentrate's solid content can be determined using a moisture analyser and can be spray-dried, for example, onto a suitable carrier. Many carriers are well known in the art, for example, without limitation, a potato maltodextrin carrier (for example, a ratio of about 1:1 solids of the 2× concentrate to carrier may be suitable). Optionally an anti-caking agent may be added, such agents are well known. A suitable anti-caking agent is, for example, tricalciumphosphate (TPC); about 0.5% (wt/wt) based on total weight of the 2× concentrate would be a suitable amount.

The final form of the salt enhancing ingredient may be chosen according to methods well known in the art and will depend on the particular food application. For liquid foods, for example soups, the salt enhancing ingredient can be used without further processing in its liquid form. For dry applications such as crackers, the spray-dried concentrated salt enhancing ingredient can be used.

The salt enhancing ingredient may be directly added to food products, or may be provided as part of a flavour composition for flavouring food products.

Flavour compositions contain the salt enhancing ingredient and optionally one or more food grade excipient. Suitable excipients for flavour compositions are well known in the art and include, for example, without limitation, solvents (including water, alcohol, ethanol, oils, fats, vegetable oil, and miglyol), binders, diluents, disintegranting agents, lubricants, flavoring agents, coloring agents, preservatives, antioxidants, emulsifiers, stabilisers, flavor-enhancers, sweetening agents, anti-caking agents, and the like. Examples of such carriers or diluents for flavours may be found e.g. in "Perfume and Flavor Materials of Natural Origin", S. Arctander, Ed., Elizabeth, N.J., 1960; in "Perfume and Flavor Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

The flavour composition may contain additional flavour ingredients including flavour compounds, flavours from natural sources including botanical sources and including ingredients made by fermentation.

The flavour composition may have any suitable form, for example liquid or solid, wet or dried, or in encapsulated form bound to or coated onto carriers/particles or as a powder.

If the salt enhancing ingredient is added as an unconcentrated liquid, about 0.005 to about 0.5% (wt/wt) are usually enough in reduced or low sodium applications, for example, without limitation, in soups and topical food applications such as chips, crips and snacks. Depending on the food product more may be needed. For most topical applications, about 0.1% to about 0.5% (wt/wt) are sufficient. When using a concentrate (for example by distillation) or a spray-dried salt enhancing ingredient, the concentrations indicated need to be adjusted with an appropriate factor to take into account of the concentration change in the salt enhancing ingredient.

Food Products

The term food product is used in a broad meaning to include any product placed into the oral cavity but not necessarily ingested, including, without limitation, food, beverages, nutraceuticals and dental care products including mouth wash.

Food products include cereal products, rice products, pasta products, ravioli, tapioca products, sago products, baker's products, biscuit products, pastry products, bread products, confectionery products, dessert products, gums, chewing gums, chocolates, ices, honey products, treacle products, yeast products, salt and spice products, savory products, mustard products, vinegar products, sauces (condiments), processed foods, cooked fruits and vegetable products, meat and meat products, meat analogues/substitutes, jellies, jams, fruit sauces, egg products, milk and dairy products, cheese products, butter and butter substitute products, milk substitute products, soy products, edible oils and fat products, medicaments, beverages, juices, fruit juices, vegetable juices, food extracts, plant extracts, meat extracts, condiments, nutraceuticals, gelatins, tablets, lozenges, drops, emulsions, elixirs, syrups, and combinations thereof.

Of particular interest are, without limitation, food products traditionally high in sodium salt with a reduced sodium salt concentration, including condiments and sauces (cold, warm, instant, preserved, sate, tomato, BBQ Sauce, Ketchup, mayonnaise and analogues, bechamel), gravy, chutney, salad dressings (shelf stable, refrigerated), batter mixes, vinegar, pizza, pasta, instant noodles, french fries, croutons, salty snacks (potato chips, crisps, nuts, tortilla-tostada, pretzels, cheese snacks, corn snacks, potato-snacks, ready-to-eat popcorn, microwaveable popcorn, caramel corn, pork rinds, nuts), crackers (Saltines, 'Ritz' type), "sandwich-type" cracker snacks, breakfast cereals, cheeses and cheese products including cheese analogues (reduced sodium cheese, pasteurized processed cheese (food, snacks & spreads), savoury spreads, cold pack cheese products, cheese sauce products), meats, aspic, cured meats (ham, bacon), luncheon/breakfast meats (hotdogs, cold cuts, sausage), soya-based products, tomato products, potato products, dry spice or seasoning compositions, liquid spice or seasoning compositions including pesto, marinades, and soup-type/meal-alternative beverages, and vegetable juices including tomato juice, carrot juice, mixed vegetable juices and other vegetable juices. Processed foods include margarine, peanut butter, soup (clear, canned, cream, instant, UHT), gravy, canned juices, canned vegetable juice, canned tomato juice, canned fruit juice, canned juice drinks, canned vegetables, pasta sauces, frozen entrees, frozen dinners, frozen hand-held entrees, dry packaged dinners (macaroni & cheese, dry dinners-add meat, dry salad/side dish mixes, dry dinners-with meat). Soups may be in different forms including condensed wet, ready-to-serve, ramen, dry, and bouillon, processed and pre-prepared low-sodium foods.

Depending on the food product, for food products that contain about 10 to 100%, for example 25 to 50%, less sodium than a comparable food product (for example "reduced sodium" products with 25% reduction, or "light in sodium" products with a 50% reduction), the salt enhancing ingredient may be employed as follows: a useful concentration for most food applications may be, for example, about 0.001% to about 0.015% (wt/wt) based on the unconcentrated salt enhancing ingredient. Alternatively, for example, 25 to 300 ppm or 0.002% to 0.03% (wt/wt) based on a spray-dried 2× concentrate may be used.

The salt enhancer may be used in unconcentrated or concentrated form or the concentrate may be formulated into a paste or powder by methods known in the art.

In this case the amount to be used has to be adjusted accordingly. Flavour compositions such as spices are often more concentrated, for example a 10× concentrate, and the concentration will be adjusted higher accordingly (250 ppm to 3000 ppm).

The NaCl concentration in common food products with a regular NaCl concentration varies with most products ranging from about 0.5% to about 5% (wt/wt) NaCl. Seasoning or products used as seasoning, such as croutons, sauces or salad dressings that are employed in a small amount (to be applied to, for example, salad or noodles), have a concentration of for example from about 2% to about 5% (wt/wt) NaCl. Soups usually contain about 0.6% to about 1.25% (wt/wt) NaCl. Salty crackers and meat products (salami, ham, bacon) usually contain about 2% to about 4% (wt/wt) NaCl. Cereals usually contain about 0.6 to 3% (wt/wt) NaCl. Products that need to be reconstituted (dry soups) usually range in the concentration ranges indicated after reconstitution.

For low sodium products containing even less NaCl than products with reduced sodium content (353 mg per serving), the amount of the salt enhancing ingredient may have to be increased.

For food products with added KCl depending on the food product and said ingredients, the concentration of KCl may be from about 0.1% or about 0.2% up to about 1%, up to about 1.5%, up to about 2% (wt/wt), or higher, depending on how much the sodium concentration is reduced. A KCl concentration of about 0.25% to about 1.5% (wt/wt), for example about 0.5% to about 1.5% (wt/wt) KCl will be useful for most low sodium products. A range to which the NaCl concentration may usefully be reduced for most applications is, for example, about 0.25% (wt/wt) to about 2.5% (wt/wt), or from about 0.125% to about 1.25% (wt/wt). The amount of the salt enhancing ingredient to be added to the food product as an ingredient will depend on the concentration of KCl used, and the specific food product including the particular base and flavour. A useful concentration for most food applications may be, for example, about 0.001% to about 0.015% (wt/wt) based on the unconcentrated salt enhancing ingredient. Alternatively, for example, 25 to 300 ppm or 0.002% to 0.03% (wt/wt) based on a spray-dried 2× concentrate may be used.

The salt enhancing ingredient may be used in un-concentrated form or the concentrate may be formulated into a paste or powder or spray-dried salt enhancing ingredient by methods known in the art. In this case, the amount to be used has to be adjusted accordingly.

The appropriate concentration of the salt enhancing ingredient can be easily tested by an organoleptic titration. This technique is well known in the field of sensory analysis.

EXAMPLES

Unless otherwise indicated, percentages or ratios are given as wt/wt.

Example 1

Enzymatic Hydrolysis and Fermentation of Celery

Various different samples were prepared and are indicated in the table below.

Fresh celery stalks were finely chopped with a food processor. Water was added in a 1:2 ratio to the chopped celery and the slurry was liquified in the food processor.

A part of the liquified celery slurry was separated by distillation into a volatile and a non-volatile/pot residue fraction.

In parallel, instead of liquified slurry of fresh celery, liquified slurry of dehydrated celery was used in a concentration of 15% in water, and achieved similar results.

The liquified slurry of fresh or dehydrated celery, or their volatile or non-volatile fractions, were heated to 50° C. and the following samples, each a combination of proteolytic and carbohydrase enzymes, were prepared:

| | |
|---|---|
| a) Alcalase ™ (0.1%) | A |
| b) Umamizyme ™ (0.1%) | U |

-continued

| | | |
|---|---|---|
| c) Flavorpro 373™ (0.1%) | | G |
| d) Alcalase™ (0.1%) & Ceramix™ (0.1%) | | A&C |
| e) Umamizyme™ (0.1%) & Viscozyme™ (0.1%) | | U&V |
| f) A & C & Glutaminase (Flavorpro 373™) | | A&C&G |
| g) U&V& Glutaminase (Flavorpro 373™) | | U&V&G |

Ceremix™ (Novozymes, Bagsvaerd, Denmark) has an activity of 300 Beta-Glucanase Units (BGU) per gram of enzyme; per gram starting material (liquified celery slurry), 0.3 BGU are used. Viscozyme™ (Novozymes, Bagsvaerd, Denmark) has an activity of 100 Fungal Beta-Glucanase Units FBG per gram of enzyme; per gram starting material, 0.1 FBG are used.

Alcalase™ (Novozymes, Bagsvaerd, Denmark) has an activity of 2.4 Anson untis (AU) per gram of enzyme, per gram starting material, 0.0024 AU are used.

Umamizyme™ (Amano, Nagoya, Japan) has an activity of 70 U (Units by LGG method, LGG=L-Leucyl-Glycyl-Glycine); per gram starting material, 0.07 U are used.

A Glutaminase, Flavorpro 373™ (Biocatalysts, Cardiff, UK), may be used as a proteolytic enzyme. Flavorpro 373™ has an activity of 30 Glutaminase Units (GU); per gram starting material, 0.0075 GU are used.

Alcalase™, Umamizyme™ and Glutaminase (Flavorpro 373™) are proteolytic/peptidolytic enzymes, while Ceremix™ and Viscozyme™ are carbohydrase enzymes.

Enzymatic hydrolysis was allowed to proceed for 18 to 22 hours at 50° C. while stirring at 150 rpm to form a hydrolysate.

The hydrolysate was then cooled to 37° C. and inoculated with an overnight culture of a strain of *Lactobacillus plantarum* (cell density of about $10^6$ cells/g) in a concentration of 0.3% overnight culture per hydrolyzed material/fermentation broth.

The inoculated material underwent fermentation for about 24 hours (or unit the pH had lowered to about pH 4) at 37° C. under minimal stirring. Fermentation was followed by a final heat treatment of 121° C. for 30 min.

TABLE 1

Samples and controls

| No. | Tag | Sensory evaluation of saltiness |
|---|---|---|
| Controls | | |
| C1 | volatile fraction | Volatiles of liquified celery (30%) |
| C2 | non-volatile fraction | Non-volatiles of liquified celery (70%) |
| C3 | whole celery (fresh or dehydrated/ rehydrated) | whole liquified celery slurry (100%) |
| Enzymatically hydrolyzed non-volatile samples | | |
| S4 | HA | Enzymatic hydrolysis with A |
| S5 | HU | Enzymatic hydrolysis with U |
| S6 | HG | Enzymatic hydrolysis with G |
| S7 | HAC | Enzymatic hydrolysis with C&A |
| S8 | HACG | Enzymatic hydrolysis with C&A&G |
| S9 | HUV | Enzymatic hydrolysis with V&U |
| S10 | HUVG | Enzymatic hydrolysis with V&U&G |
| Fermented enzymatically hydrolyzed non-volatile samples | | |
| S11 | FA | Fermentation of enzymatic hydrolysate with A |
| S12 | FU | Fermentation of enzymatic hydrolysate with U |
| S13 | FG | Fermentation of enzymatic hydrolysate with G |
| S14 | FAC | Fermentation of enzymatic hydrolysate with A&C |

TABLE 1-continued

Samples and controls

| No. | Tag | Sensory evaluation of saltiness |
|---|---|---|
| S15 | FACG | Fermentation of enzymatic hydrolysate with A&C&G |
| S16 | FUV | Fermentation of enzymatic hydrolysate with U&V |
| S17 | FUVG | Fermentation of enzymatic hydrolysate with U&V&G |

Example 2

Sensory Evaluation

The samples of example 1 (S4-S17) were organoleptically evaluated by trained flavorists in a fat-free reduced sodium chicken broth (sodium 480 mg/serving) at a sample or control concentration of 0.02%. The chicken broth was served warm (about 37° C.) for tasting.

The samples were presented against the 3 controls of example 1 (C1-C3), each of which was cooked under conditions similar to the distillation (100° C. and 150 rpm stirring for 4-5 hours).

The results are shown in the table below.

TABLE 2

Samples and their sensory evaluation

| No. | Tag | Sensory evaluation of saltiness |
|---|---|---|
| Controls | | |
| C1 | volatile fraction | Immediate saltiness of similar intensity as C2 and C3. Less intensity and duration than S4-17. Sample with similar intensity but shorter duration as C2 and C3. |
| C2 | non-volatile fraction | Delayed saltiness. Late saltiness sensation of similar intensity as C1 and C3. Less intensity and shorter duration than S4-17. |
| C3 | whole celery | Immediate saltiness of longer duration than C1. Similar intensity as C1 and C2. Less intensity and shorter duration than S4-17. |
| Enzymatically hydrolyzed non-volatile samples | | |
| S4 | HA | More intensive saltiness with later onset but longer duration compared to C1-3. Late saltiness is more intensive than C1-3. |
| S5 | HU | More intensive saltiness with later onset but longer duration compared to C1-3. Late saltiness is more intensive than C1-3. |
| S6 | HG | More intensive saltiness with later onset but longer duration compared to C1-3. Late saltiness is more intensive than C1-3. |
| S7 | HAC | More intensive saltiness with later onset but longer duration compared to C1-3. Late saltiness is more intensive than C1-3 and S4. |
| S8 | HACG | More intensive saltiness with later onset but longer duration compared to C1-3. Late saltiness is more intensive saltiness than C1-3, S4, and S6. |
| S9 | HUV | More intensive saltiness with later onset but longer duration compared to C1-3. Late saltiness is more intensive saltiness than C1-3 and S5. Longer lasting and more intensive saltiness than S7&8. Very similar saltiness character (onset, intensity, duration) to S10. |
| S10 | HUVG | More intensive saltiness with later onset but longer duration compared to C1-3. Late saltiness is more intensive saltiness than C1-3, S5, and S6. |

TABLE 2-continued

Samples and their sensory evaluation

| No. | Tag | Sensory evaluation of saltiness |
|---|---|---|
| | | Longer lasting and more intensive saltiness than S7&8. |
| | | Very similar saltiness character (onset, intensity, duration) to S9. |
| Fermented enzymatically hydrolyzed non-volatile samples | | |
| S11 | HA | More intensive saltiness with later onset but longer duration compared to C1-3 and S4. |
| S12 | HU | More intensive saltiness with later onset but longer duration compared to C1-3 and S5. |
| S13 | HG | More intensive saltiness with later onset but longer duration compared to C1-3 and S6. |
| S14 | FAC | More intensive saltiness with later onset but longer duration compared to C1-3, S4, and S11. More intensive saltiness than S7 (w/o fermentation). |
| S15 | FACG | More intensive saltiness with later onset but longer duration compared to C1-3, and S11. More intensive saltiness than S8 (w/o fermentation). Similar intensity, onset and duration to S14. |
| S16 | FUV | More intensive saltiness with later onset but longer duration compared to C1-3. More intensive saltiness than S9 (w/o fermentation). Highest salt intensity of all samples. |
| S17 | FUVG | More intensive saltiness with later onset but longer duration compared to C1-3. More intensive saltiness than S10 (w/o fermentation). Highest salt intensity of all samples except for S16. |

When instead of the non-volatile fraction of fresh celery, samples were made using enzymatically hydrolyzed or enzymatically hydrolyzed and fermented whole fresh celery or dehydrated celery, the results were very similar to samples S4-S17.

While the processes, ingredients and food products have been described above in connection with certain illustrative embodiments, it is to be understood that other similar embodiments may be used or modifications and additions may be made to the described embodiments for performing the same function(s). Further, all embodiments disclosed are not necessarily in the alternative, as various embodiments may be combined to provide the desired characteristics. Variations can be made by one having ordinary skill in the art without departing from the spirit and scope of the disclosure. Therefore, the processes, ingredients and food products should not be limited to any single embodiment, but rather construed in breadth and scope in accordance with the recitation of the attached claims.

The invention claimed is:

1. A process of forming a salt enhancing ingredient, the process comprising the steps of (i) forming an aqueous slurry of *Apium graveolens* plant material and liquifying the aqueous slurry, (ii) forming a hydrolysate of *Apium graveolens* plant material by subjecting the *Apium graveolens* plant material to an enzymatic hydrolysis using one or more carbohydrase enzymes subsequent to enzymatic hydrolysis by one or more proteolytic enzyme, wherein the one or more proteolytic enzymes comprise an enzyme preparation from *Aspergillus oryzae* and wherein the hydrolysis is performed at 40° C. to 60° C., (iii) subjecting the hydrolysate to fermentation using a *Lactobacillus* at a temperature from 20° C. to 40° C., wherein the one or more proteolytic enzymes comprise both endopeptidase and exopeptidase activity, (iv) heating the fermented hydrolysate in order to inactivate the microorganisms and enzymes present in the fermented hydrolysate, to form a fermented hydrolyzed salt enhancing ingredient, wherein the enzymes and microorganisms present in the formed salt enhancing ingredient are inactivated by heating.

2. The process according to claim 1, wherein the one or more proteolytic enzymes are selected from the group consisting of proteinase, peptidase, and glutaminase.

3. The process according to claim 1, wherein the *Lactobacillus* microorganism is selected from the group consisting of: *L. plantarum, L. casei, L. brevis* and *L. helveticus*.

4. The process according to claim 1, wherein the hydrolysate is subjected to fermentation using a *Lactobacillus* at a temperature from 20° C. to 40° C. at a starting pH of at least 6.

5. The process according to claim 3, wherein the *Lactobacillus* microorganism is *L. helveticus*.

6. The process according to claim 3, wherein the *Lactobacillus* microorganism is *L. plantarum*.

\* \* \* \* \*